United States Patent
Baik et al.

(10) Patent No.: US 10,539,664 B2
(45) Date of Patent: Jan. 21, 2020

(54) DISTANCE SENSOR, AND CALIBRATION METHOD PERFORMED BY DEVICE AND SYSTEM INCLUDING THE DISTANCE SENSOR

(71) Applicant: SAMSUNG ELECTRONICS CO., LTD., Suwon-si (KR)

(72) Inventors: A-ron Baik, Seongnam-si (KR); Jung-gap Kuk, Seoul (KR); Chang-soo Park, Seoul (KR); Seung-beom Han, Suwon-si (KR); Mid-eum Choi, Seoul (KR); Jung-un Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 267 days.

(21) Appl. No.: 15/592,584

(22) Filed: May 11, 2017

(65) Prior Publication Data

US 2017/0328992 A1    Nov. 16, 2017

Related U.S. Application Data

(60) Provisional application No. 62/334,625, filed on May 11, 2016.

(30) Foreign Application Priority Data

Feb. 7, 2017    (KR) .................. 10-2017-0016851

(51) Int. Cl.
*G01C 3/08*    (2006.01)
*G01S 7/497*    (2006.01)
(Continued)

(52) U.S. Cl.
CPC ............ *G01S 7/497* (2013.01); *G01S 7/4815* (2013.01); *G01S 7/4972* (2013.01); *G01S 17/42* (2013.01); *G01S 17/936* (2013.01)

(58) Field of Classification Search
CPC ...... G01S 7/497; G01S 7/4972; G01S 7/4816; G01S 17/42; G01S 17/936
(Continued)

(56) References Cited

U.S. PATENT DOCUMENTS 9,046,600 B2    6/2015  James
9,097,800 B1    8/2015  Zhu
(Continued)

FOREIGN PATENT DOCUMENTS

DE    10 2010 018 088 A1    10/2011
EP       2 990 828 A1        3/2016
WO      2015/195585 A1      12/2015

OTHER PUBLICATIONS

Mark Sheehan, et al., "Self-Calibration for a 3D Laser", The International Journal of Robotics Research (IJRR), 2012, pp. 1-12.
Kelley Gallagher, "Avalanche Photodiode Gain or Multiplication M. Avalanche Photodiode Typical multiplication (gain) M vs. reverse bias characteristics for a typical commercial", http://slideplayer.com/slide/7456453, 2016, total 7 pages.
(Continued)

*Primary Examiner* — Mark Hellner
(74) *Attorney, Agent, or Firm* — Sughrue Mion, PLLC

(57) ABSTRACT

A calibration method performed by a distance sensor emitting at least one beam is provided. The calibration method includes obtaining information regarding one surface of an object; obtaining distance sensor data by emitting a plurality of beams to the one surface of the object; and performing calibration on the plurality of beams emitted by the distance sensor, based on the information about the one surface of the object and the distance sensor data.

21 Claims, 15 Drawing Sheets

(51) Int. Cl.
*G01S 17/42* (2006.01)
*G01S 17/93* (2006.01)
*G01S 7/481* (2006.01)

(58) Field of Classification Search
USPC ........................................................ 356/5.01
See application file for complete search history.

(56) References Cited

U.S. PATENT DOCUMENTS

| | | |
|---|---|---|
| 9,134,402 B2 | 9/2015 | Sebastian et al. |
| 2012/0173185 A1 | 7/2012 | Taylor et al. |
| 2013/0173201 A1* | 7/2013 | Hukkeri ................ G01S 7/4004 702/104 |
| 2015/0009049 A1 | 1/2015 | Subramanya |
| 2015/0153453 A1 | 6/2015 | Kane et al. |
| 2015/0293228 A1 | 10/2015 | Retterath et al. |
| 2015/0362587 A1 | 12/2015 | Rogan et al. |
| 2016/0121906 A1 | 5/2016 | Matsuno et al. |
| 2017/0102456 A1* | 4/2017 | Chan ....................... G01S 7/497 |

OTHER PUBLICATIONS

Jesse Levinson, et al., "Unsupervised Calibration for Multi-beam Lasers", International Symposium on Experimental Robotics (ISER), 2010, total 8 pages.

Mid-Eum Choi, et al., "Multi-Beam LIDAR Calibration Using Rényi Quadratic Entropy Measure", Samsung, Best Paper Award 2016, pp. 1-2.

Changsoo Park, et al., "Intrinsic Calibration of Multi-Beam Lidar without Explicit Pose Information", Samsung, Best Paper Award 2016, pp. 1-2.

SensL (Sense light), "Low Noise, Blue-Sensitive Silicon Photomultipliers", C-Series Low Noise, Blue-Sensitive Silicon Photomultipliers, Datasheet, Rev. 2.7, Preliminary, Mar. 2017, pp. 1-19.

Communication dated Jan. 17, 2019 issued by the European Patent Office in European counterpart Application No. 17796362.6.

International Search Report and Written Opinion, dated Jul. 26, 2017 by International Searching Authority in counterpart International Application No. PCT/KR2017/004802 (PCT/ISA/220, PCT/ISA/210, & PCT/ISA/237).

* cited by examiner

BEFORE MATCHING         AFTER MATCHING

DISTANCE SENSOR, AND CALIBRATION METHOD PERFORMED BY DEVICE AND SYSTEM INCLUDING THE DISTANCE SENSOR

CROSS-REFERENCE TO RELATED APPLICATION

This application claims the benefit of U.S. Provisional Patent Application No. 62/334,625, filed on May 11, 2016 in the U.S. Patent and Trademark Office, and the benefit of Korean Patent Application No. 10-2017-0016851, filed on Feb. 7, 2017 in the Korean Intellectual Property Office, the disclosures of which are incorporated herein in their entireties by reference.

BACKGROUND

1. Field

Apparatuses, methods and systems consistent with exemplary embodiments relate to calibration of a distance sensor.

2. Description of the Related Art

Recently, due to convergence of information communication technology and the vehicle industry, cars are rapidly becoming smarter. Due to this increased smartness, cars are evolving from being merely mechanical devices to actual smart cars, and in particular, autonomous driving is being highlighted as a core technology of smart cars.

Autonomous driving refers to technology that allows a car to drive itself to a destination without a human driver manipulating a steering wheel, an accelerator, a brake, or the like. One important device to implement such autonomous driving is a distance sensor. The distance sensor outputs various waveforms such as ultrasound waves, laser, etc., and then obtains reflected waveforms, thereby controlling a car by recognizing and determining driving surroundings.

FIG. 1 illustrates an autonomous driving system of a car using a light detection and ranging (lidar) sensor.

As shown in FIG. 1, a lidar sensor 11 is mounted in a car 103. The lidar sensor 11 refers to a type of a distance sensor and is used to sense a shape of and distance to an object in the vicinity of the car 103 while driving. For example, the lidar sensor 11 may obtain information about a road shape, a road sign, a distance to a car ahead, etc. In more detail, the lidar sensor 11 may obtain information about a shape of an object by outputting a laser beam.

For autonomous driving, safety has to be guaranteed, and thus, there is an increasing demand for accuracy of object information obtained by a distance sensor such as a lidar sensor. In particular, in the case where the distance sensor obtains shape information about an object by using a plurality of waveforms, there is a possibility that accurate shape information of the object cannot be obtained because characteristics of the waveforms are different from each other. In addition, due to a change in surroundings, there is a high possibility that an error may occur in the shape information about the object obtained by the distance sensor, and therefore, calibration of the distance sensor is required for accuracy of the distance sensor.

SUMMARY

Exemplary embodiments provide distance sensor and a calibration method performed to increase accuracy of a distance sensor.

According to an aspect of an exemplary embodiment, there is provided a calibration method performed by a distance sensor, the calibration method including: obtaining information about one surface of an object; obtaining distance sensor data by emitting a plurality of beams from the distance sensor to the one surface of the object and receiving a plurality of reflection signals of the plurality of beams; and performing calibration on the plurality of beams emitted by the distance sensor, based on the information about the one surface of the object and the distance sensor data.

The obtaining the information about the one surface of the object may include obtaining the information about the one surface of the object from an external server, and the information about the one surface of the object may include location information of the object and shape information about a shape of the one surface of the object.

The obtaining the distance sensor data may include: emitting the plurality of beams, based on the location information of the object; and obtaining the distance sensor data about the one surface of the object, based on a plurality of reflection results corresponding to the plurality of reflection signals of the plurality of beams.

The performing the calibration may include: comparing the shape information about the shape of the one surface of the object with each of the plurality of reflection results corresponding to the plurality of reflection signals of the plurality of beams; and performing the calibration on each of the plurality of beams, based on results of the comparing.

The performing the calibration on each of the plurality of beams may include adjusting a parameter for processing the plurality of reflection signals of the plurality of beams to obtain the plurality of reflection results so as to make the plurality of reflection results corresponding to the plurality of reflection signals of the plurality of beams be equal to each other or to make the plurality of reflection results corresponding to the plurality of reflection signals of the plurality of beams be equal to predicted reflection results.

The parameter may include at least one of a beam horizontal angle parameter, a beam vertical angle parameter, a measurement distance offset parameter, and a reflectance parameter.

The obtaining the information about the one surface of the object may include: obtaining movement information about a movement distance of the distance sensor and a movement direction of the distance sensor; and obtaining the information about the one surface of the object, based on the movement information about the movement distance and the movement direction of the distance sensor.

The obtaining the information about the one surface of the object, based on the movement information about the movement distance of the distance sensor and the movement direction of the distance sensor may include: emitting, at a first location, a first beam to the object and obtaining a first reflection result corresponding to a first reflection signal of the first beam; emitting, at a second location, a second beam to the object and obtaining a second reflection result corresponding a second reflection signal of the second beam; obtaining the movement information about the movement distance of the distance sensor and the movement direction of the distance sensor, based on the first reflection result and the second reflection result; and obtaining the information about the one surface of the object, based on the movement information about the movement distance of the distance sensor and the movement direction of the distance sensor, the first reflection result, and the second reflection result.

The obtaining the movement information about the movement distance of the distance sensor and the movement direction of the distance sensor, based on the first reflection result and the second reflection result, may include: estimating the first location and the second location, based on the first reflection result and the second reflection result; matching the first reflection result with the second reflection result; and predicting the first location and the second location, based on a result of the matching.

The matching the first reflection result with the second reflection result may include matching the first reflection result with the second reflection result based on data obtained by using at least one sensor other than the distance sensor.

According to an aspect of another exemplary embodiment, there is provided a distance sensor including: a sensing unit configured to emit a plurality of beams and receive a plurality reflection signals of the plurality of beams; and a processor configured to obtain information about one surface of an object, control the sensing unit to obtain distance sensor data by emitting the plurality of beams to the one surface of the object and receive the plurality of reflection signals of the plurality of beams, and perform calibration on at least one beam from among the plurality of beams emitted by the sensing unit, based on the information about the one surface of the object and the distance sensor data.

The processor may be further configured to obtain the information about the one surface of the object from an external server, and the information about the one surface of the object may include location information of the object and shape information about a shape of the one surface of the object.

The processor may be further configured to control the sensing unit to emit the plurality of beams, based on the location information of the object, and to obtain the distance sensor data about the one surface of the object, based on a plurality of reflection results corresponding to the reflection signals of the plurality of beams.

The processor may be further configured to perform a comparison of the shape information about the shape of the one surface of the object with each of the plurality of reflection results corresponding to the reflection signals of the plurality of beams, and to perform the calibration on each of the plurality of beams, based on results of the comparison.

The processor may be further configured to adjust an parameter for processing the reflection signals of the plurality of beams to obtain the plurality of reflection results so as to make the plurality of reflection results corresponding to the reflection signals of the plurality of beams be equal to each other or to make the plurality of reflection results corresponding to the reflection signals of the plurality of beams be equal to predicted reflection results.

The parameter may include at least one of a beam horizontal angle parameter, a beam vertical angle parameter, a measurement distance offset parameter, and a reflectance parameter.

The processor may be further configured to control the sensing unit to obtain movement information about a movement distance of the distance sensor and a movement direction of the distance sensor, and to obtain the information about the one surface of the object, based on the information about the movement distance of the distance sensor and a movement direction of the distance sensor.

The processor may be further configured to: control the sensing unit to emit, at a first location, a first beam to the object to obtain a first reflection result corresponding to a first reflection signal of the first beam, control the sensing unit to emit, at a second location, a second beam to the object to obtain a second reflection result corresponding to a second reflection signal of the second beam, obtain the information about the movement distance of the distance sensor and the movement direction of the distance sensor, based on the first reflection result and the second reflection result, and obtain the information about the one surface of the object, based on the information about the movement distance of the distance sensor and the movement direction of the distance sensor, the first reflection result, and the second reflection result.

The processor may be further configured to match the first reflection result with the second reflection result, and to predict the first location and the second location, based on a result of the matching.

The processor may be further configured to match the first reflection result with the second reflection result by using data obtained by using at least one sensor other.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
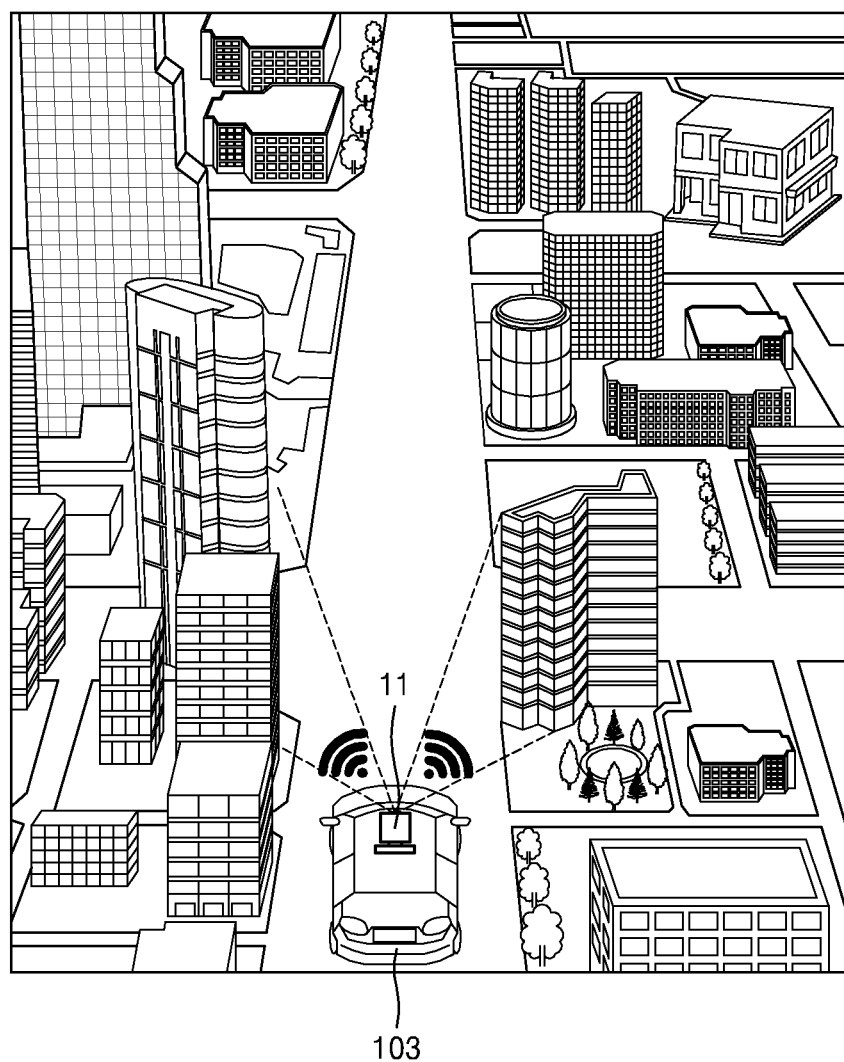
FIG. 1 illustrates an autonomous driving system of a car using a light detection and ranging (lidar) sensor.

All terms including descriptive or technical terms which are used herein should be construed as having meanings that are known to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Throughout the specification, it will also be understood that when an element is referred to as being "connected to" another element, it can be directly connected to the other element, or intervening elements may also be present. Also, when a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

In the specification, the term "and/or" includes any and all combinations of one or more of the associated listed items. Also, expressions such as "at least one of," when preceding a list of elements, modify the entire list of elements and do not modify the individual elements of the list.

Throughout the specification, a distance sensor is a sensor for obtaining a shape or location of an object, and may include, but is not limited to, a time-of-flight (TOF) sensor, a structured light sensor, an ultrasound sensor, an infrared light sensor, and a laser sensor such as a light detection and ranging (lidar) sensor. The distance sensor may output various waveforms such as ultrasound waves, laser, etc., and then may receive waveforms reflected from an object, thereby obtaining a shape or location of the object. In addition, the distance sensor may obtain information about a shape and location of an object and a distance to the object by using a time-of-flight scheme of measuring a distance to the object based on a time of flight from a measurement point to the object, or a method of measuring a distance by performing triangulation using light. The lidar sensor may include, but is not limited to, a multibeam lidar sensor, and a microelectromechanical systems (MEMS)/optical phased arrays (OPA) lidar sensor.

Throughout the specification, an external server may include a single server, a group of servers, a cloud server, or the like. The external server may also include a map server and a database server. In addition, the external server may include map data including information about locations of various objects such as roads, road signs, traffic signals, buildings, etc. However, examples of the external server are not limited thereto.

Throughout the specification, a beam refers to a stream of light or various waveforms and may particularly include a laser beam. However, examples of the beam are not limited thereto.

Throughout the specification, a reflection result may include processed data based on a reflection signal and a reflection time, wherein the reflection signal refers to a beam emitted to and then reflected from an object, and the reflection time refers to a period of time during which the emitted beam is reflected and thus returns. That is, the distance sensor may include modeling data obtained by generating an image of the object or modeling the object according to the reflection signal and the reflection time.

Throughout the specification, distance sensor data may include all data obtained by a distance sensor, emitting at least one beam and receiving a reflection result from an object. That is, the distance sensor data may include not only data before processing the reflection result but may also include data obtained by processing the reflection result, an image of one surface or three-dimensional (3D) point cloud, video, the object modeled based on the obtained data, and data obtained by modeling the object. In addition, the distance sensor data may include data obtained by combining or incorporating a plurality of results of reflection.

Throughout the specification, matching may refer to combining at least two results of reflection by arranging the at least two results of reflection in which an angle, a size, and a location are adjusted. That is, the matching may refer to a process of combining, by a distance sensor, at least two results of reflection in various manners based on predetermined references.

Throughout the specification, calibration refers to, but is not limited to, adjusting an emission position, an angle, intensity, or the like of at least one beam emitted from a sensor, or adjusting a parameter used to process a reflection result so as to obtain more accurate distance sensor data.

Figure 2:
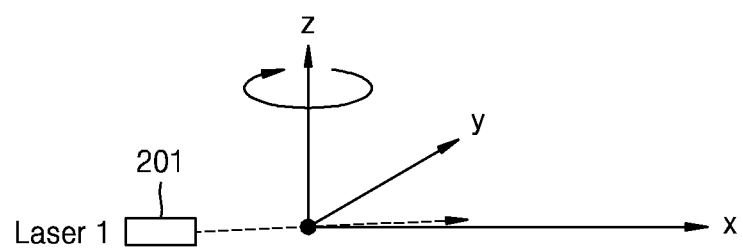
FIGS. 2 and 3 illustrate a structure of a distance sensor for emitting a beam or a plurality of beams, according to some exemplary embodiments.
Figure 3:
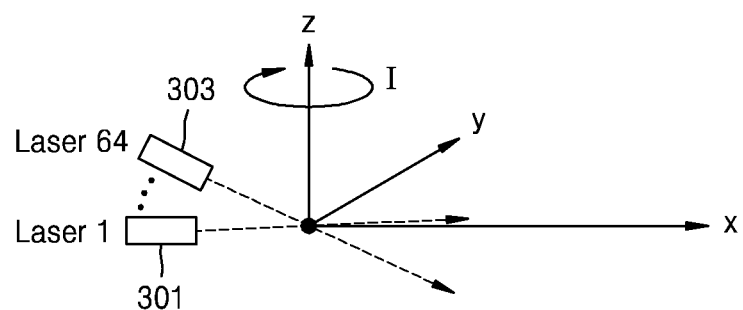

FIGS. 2 and 3 illustrate a structure of a distance sensor for emitting a beam or a plurality of beams, according to some exemplary embodiments.

As illustrated in FIGS. 2 and 3, the distance sensor may include a laser emitter 201 or a plurality of laser emitters 301 through 303. Each of the laser emitters 301 through 303 may be the same as the laser emitter 201. Each of the laser emitter 201 and the laser emitters 301 through 303 may output a beam, and as described above, the beam may include a laser beam. In addition, as described above, the distance sensor may not include a laser emitter but instead may include an ultrasound emitter or an infrared light emitter.

According to some exemplary embodiments, the laser emitter 201 included in the distance sensor is rotational with respect to a Z-axis, a horizontal angle of the laser emitter 201 on an X-Y plane and a vertical angle of the laser emitter 201 between the X-Y plane and the Z-axis are adjustable, and a slant of the laser emitter 201 is also adjustable. Each of the laser emitters 301 through 303 may be independently adjusted with respect to its rotation, angle, and slant.

The distance sensor may emit a laser beam by using the laser emitter 201 or the laser emitters 301 through 303, and may obtain a reflection signal from an object by using at least one laser receiver. The reflection signal may include, but is not limited to, ultrasound, infrared light, visible light, or a laser beam reflected from the object. The distance sensor may obtain not only the reflection signal but may also obtain information about a reflection time.

According to some exemplary embodiments, unlike a case in which the distance sensor includes the laser emitters 301 through 303, when the distance sensor includes the laser emitter 201 (i.e., only one laser emitter), the distance sensor may not need to separately perform calibration. However, when the laser emitter 201 is used, the distance sensor cannot simultaneously emit laser beams to an object in various angles, thus, as illustrated in FIG. 3, the distance sensor including the laser emitters 301 through 303 is used.

When the laser emitters 301 through 303 as illustrated in FIG. 3 are used, an emission intensity, an angle, or the like of a laser beam may differ in the laser emitters 301 through 303, thus, even if laser beams are emitted to a same object, obtained reflection signals may be different. When processing is performed by using a same parameter and the reflection signals are different, reflection results may be different. That is, when distance sensor data is obtained based on the laser emitters 301 through 303, reflection results obtained based on the laser emitters 301 through 303 may be different from each other, so that an error may occur between a shape of the object and the distance sensor data that is a combination of the reflection results. Therefore, the distance sensor performs calibration on a plurality of beams so as to obtain an accurate shape of the object. Hereinafter, a calibration method will now be described.

Figure 4:
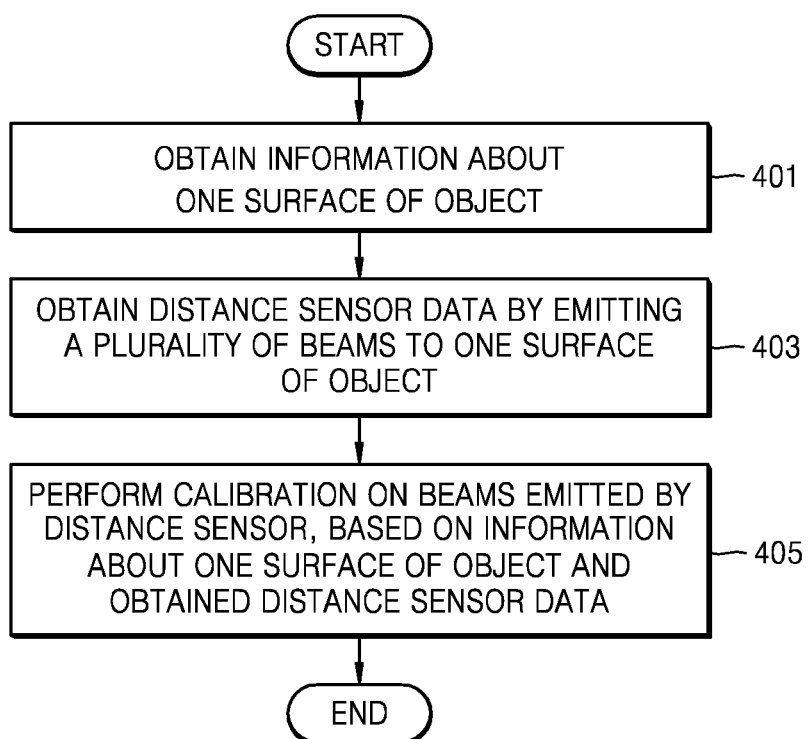
FIG. 4 is a flowchart of a calibration method performed by the distance sensor, according to some exemplary embodiments.

FIG. 4 is a flowchart of a calibration method performed by the distance sensor, according to some exemplary embodiments.

In operation 401, the distance sensor may obtain information about one surface of an object.

According to some exemplary embodiments, the distance sensor may obtain the information about one surface of the object by using at least one of various methods. For example, the distance sensor may obtain the information about one surface of the object from an external server, or may emit one beam while the distance sensor is moving and may obtain the information about one surface of the object, based on reflection results of the beam according to locations.

According to some exemplary embodiments, the information about one surface of the object may include location information about a location of the object and shape information about a shape of one surface of the object. For example, the location information about a location of the object may include information indicating which object is located at certain coordinates, and the shape information about a shape of the one surface of the object may include information indicating whether a shape of one surface of the object is plane or curved, and information about a curvature or flatness of one surface. In addition, the information about one surface of the object may include reflectance information about reflectance of the object. However, examples of the information are not limited thereto.

According to some exemplary embodiments, an object may include all of identifiable objects including a road sign, a ground, a surface of a road, a wall, a license plate, a guardrail, a curb, a portion (e.g., a pillar, a side surface, etc.) of a bridge, a portion (e.g., a side surface) of a high-level road, a mark of a bus stop, a pillar for marking a waiting place or station, a signboard, etc., and examples of the object are not limited thereto.

For accurate calibration of the distance sensor, information about one surface of the object is required. That is, the distance sensor may emit a plurality of beams to one surface of the object, may obtain reflection results of the beams, and may compare the obtained reflection results of the beams, based on the information about one surface of the object, thereby performing calibration on each of a plurality of laser emitters included in the distance sensor or each of laser beams emitted from the laser emitters. Therefore, the distance sensor may obtain, by using various methods, the information about one surface of the object which is a reference with respect to performing the calibration.

In operation 403, the distance sensor may obtain distance sensor data by emitting a plurality of beams to one surface of the object.

According to some exemplary embodiments, the distance sensor may emit the beams to one surface of the object. For example, the distance sensor may emit a first beam to one surface of the object by using a first laser emitter, and may emit a second beam to one surface of the object by using a second laser emitter. The distance sensor may obtain a reflection signal that is the first beam reflected from the object, may obtain a reflection signal that is the second beam reflected from the object, and then may obtain the distance sensor data based on the obtained reflection signals.

According to some exemplary embodiments, the distance sensor may obtain reflection results by processing the obtained reflection signals with a predetermined parameter, and may obtain the distance sensor data based on one or more of the reflection results. The distance sensor data may be, but is not limited to, a plurality of items of data obtained by processing each of the reflection result of the first beam and the reflection result of the second beam, or data that is obtained by processing each of the reflection result of the first beam and the reflection result of the second beam and then combining or incorporating them. That is, the distance sensor data may include all kinds of data that the distance sensor obtained with respect to the object. In addition, the distance sensor data may be, but is not limited to, 3D point cloud data as described above.

In operation 405, the distance sensor may perform calibration on the beams emitted by the distance sensor, based on the information about one surface of the object and the obtained distance sensor data.

In more detail, the distance sensor may perform calibration by comparing the information about one surface of the object with the distance sensor data obtained by emitting the beams. For example, the distance sensor may compare the reflection result of the first beam and the reflection result of the second beam with the shape of one surface of the object which is obtained in operation 401, and may perform the calibration on the beams, based on a result of the comparison, so as to make the reflection result of the first beam and the reflection result of the second beam be equal to each other.

In addition, the distance sensor may perform calibration on a plurality of beams so as to obtain reflection results equal to predicted reflection results. For example, the distance sensor may perform the calibration so as to make the reflection result of the first beam become equal to a predicted reflection result or the reflection result of the second beam become equal to a predicted reflection result.

According to some exemplary embodiments, the calibration may include intrinsic calibration and extrinsic calibration. The intrinsic calibration refers to adjusting a parameter for processing a reflection signal of a beam, and the extrinsic calibration refers to adjusting parameters that are determined according to a location of the distance sensor.

According to some exemplary embodiments, the parameter for processing a reflection signal may be a parameter used in a process of obtaining a reflection result by obtaining a reflection signal, and may include parameters of a beam horizontal angle parameter, beam vertical angle parameter, a measurement distance offset parameter, and a reflectance parameter. However, the parameter is not limited to the examples and may include all parameters used in processing a reflection signal of a beam.

Figure 5:
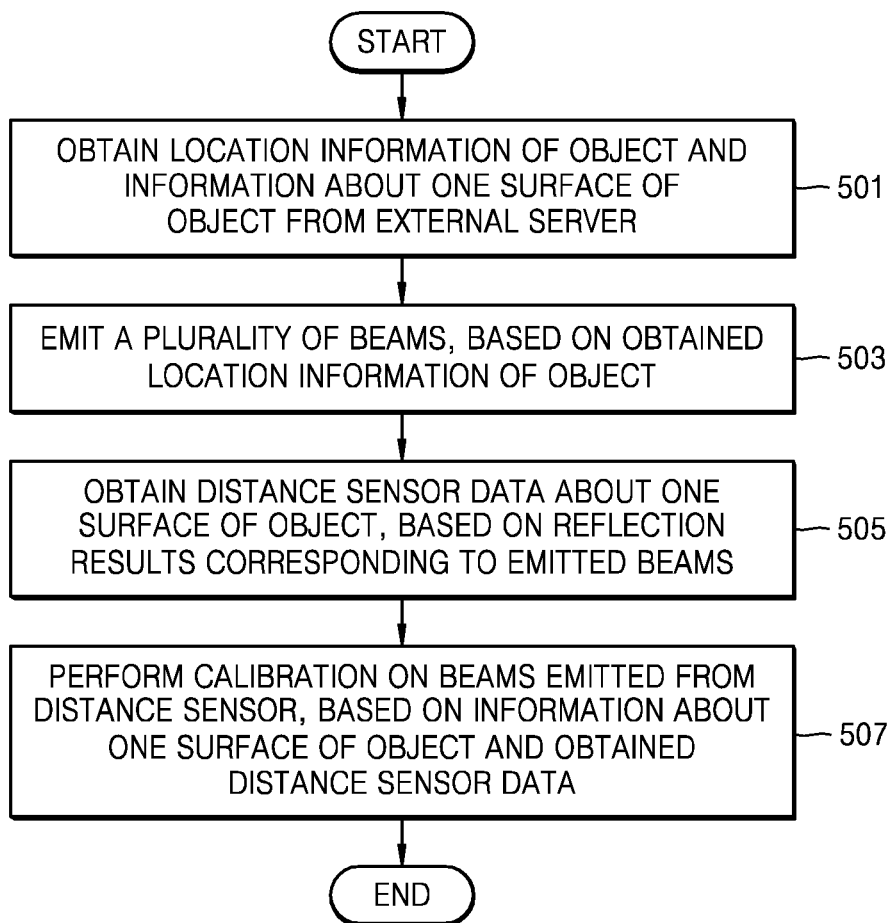
FIG. 5 is a flowchart of a calibration method based on object information received from an external server, which is performed by the distance sensor, according to some exemplary embodiments.

FIG. 5 is a flowchart of a calibration method based on object information received from an external server, which is performed by the distance sensor, according to some exemplary embodiments.

In operation 501, the distance sensor may obtain location information about a location of an object and shape information about a shape of one surface of the object from the external server.

According to some exemplary embodiments, the external server may be a server including a map database. The distance sensor may communicate with the external server by using a communication interface included in the distance sensor or a communication interface of a car. In addition, the distance sensor may communicate with the external server by using various communication methods using various frequency bands such as third generation (3G), long-term evolution (LTE), transport protocol expert group (TPEG), digital multimedia broadcasting (DMB), or the like, and may obtain the location information of the object and the information about one surface of the object from the external server.

According to some exemplary embodiments, the distance sensor may obtain map data from the external server, and may obtain the location information of the object located within a predetermined range from a location of the car, based on the location of the car in the obtained map data.

In operation 503, the distance sensor may emit a plurality of beams, based on the obtained location information of the object.

According to some exemplary embodiments, the distance sensor may emit the beams to the object by using a plurality of laser emitters, based on the obtained location information of the object. That is, the distance sensor may emit a first beam and a second beam to one surface of the object, based on the location information of the object obtained in operation 501. When the car is driving, the distance sensor may emit the first beam and the second beam to one surface of the object, by taking into account a speed and direction of the car.

In operation 505, the distance sensor may obtain distance sensor data about one surface of the object, based on reflection results corresponding to the emitted beams.

According to some exemplary embodiments, the distance sensor may obtain a reflection signal of the first beam, and may obtain a reflection signal of the second beam. The distance sensor may obtain a first reflection result and a second reflection result, wherein the first reflection result is data obtained by processing the reflection signal of the first beam, and the second reflection result is data obtained by processing the reflection signal of the second beam. The distance sensor may obtain distance sensor data based on the first reflection result and the second reflection result. According to some exemplary embodiments, the distance sensor data may be generated by incorporating or combining the first reflection result and the second reflection result, or may be generated by using one of the first reflection result and the second reflection result.

In operation 507, the distance sensor may perform calibration on the beams emitted from the distance sensor, based on the information about one surface of the object and the obtained distance sensor data.

According to some exemplary embodiments, the distance sensor may compare the distance sensor data obtained in operation 505 with the information about one surface of the object. According to some exemplary embodiments, according to a result of the comparison, the distance sensor may perform calibration on the beams so as to allow the first reflection result of the first beam and the second reflection result of the second beam to be equal to each other, or to obtain a reflection result equal to a predicted reflection result. For example, the distance sensor may adjust a parameter of processing the reflection signal of the first beam and a parameter of processing the reflection signal of the second beam or may adjust positions, angles, etc. of the laser emitters emitting the first beam and the second beam so as to allow data based on the first reflection result of the first beam and data based on the second reflection result of the second beam to be equal to each other. In addition, the distance sensor may perform calibration so as to allow the first and second reflection results and the information about one surface of the object to have an error within a predetermined range.

Figure 6:
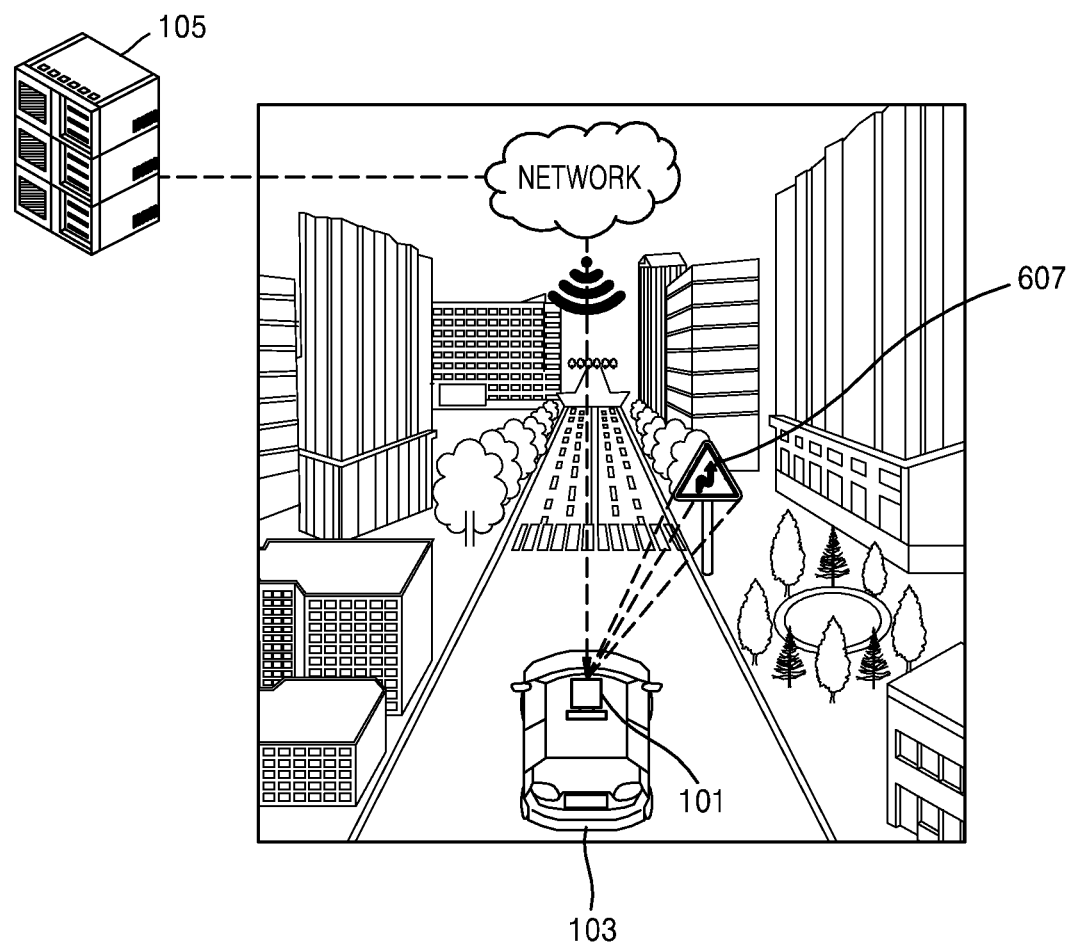
FIG. 6 illustrates a system in which calibration by a distance sensor is performed based on object information received from an external server, according to some exemplary embodiments.

FIG. 6 illustrates a system in which calibration by a distance sensor 101 is performed based on object information received from an external server 105, according to some exemplary embodiments.

According to some exemplary embodiments, a car 103 has the distance sensor 101 mounted therein. The distance sensor 101 may obtain information about one surface of an object from the external server 105. As described above, the information about one surface of the object may include location information about a location of the object, shape information about a shape of one surface of the object, and reflectance information about reflectance of the object.

Referring to the exemplary embodiment of FIG. 5, the distance sensor 101 may obtain the location information about a location of an object such as a road sign 607 and the shape information about a shape of one surface of the object, e.g., flatness of the object, from the external server 105 including a map database.

The distance sensor 101 may obtain the shape information about a shape of one surface of the object, e.g., reflectance information about reflectance of the road sign 607. For example, reflectance of a portion of the road sign 607 on which text is present may be different from reflectance of another portion of the road sign 607 on which text is not present. Therefore, the distance sensor 101 may obtain the reflectance information about reflectance of the road sign 607 by obtaining information about the text on the road sign 607.

According to some exemplary embodiments, the distance sensor 101 may emit a plurality of beams to the road sign 607, based on the location information of the road sign 607 which is obtained from the external server 105, and may obtain reflection signals of the beams reflected from the road sign 607. That is, the distance sensor 101 may emit a first beam and a second beam to the road sign 607, and may obtain distance sensor data processed based on a reflection signal of the first beam and a reflection signal of the second beam.

According to some exemplary embodiments, the distance sensor 101 may compare each of a reflection result of the first beam and a reflection result of the second beam with the shape information about a shape of one surface of the object, the information being received from the external server 105. For example, the distance sensor 101 may compare each of the reflection result of the first beam and the reflection result of the second beam with information about a distance to the road sign 607, flatness of the road sign 607, and reflectance of the road sign 607.

According to results of the comparison, the distance sensor 101 may perform calibration so as to allow the reflection result of the first beam and the reflection result of the second beam to be equal to each other. According to some exemplary embodiments, in order to make the reflection result of the first beam and the reflection result of the second beam be equal to each other, the distance sensor 101 may adjust a parameter of processing the reflection signal of the first beam so as to generate the reflection result of the first beam, and a parameter of processing the reflection signal of the second beam so as to generate the reflection result of the second beam.

For example, when the reflection signal of the first beam and the reflection signal of the second beam are received with angles having a difference of five degrees therebetween, the distance sensor 101 may adjust a parameter of processing the reflection signals of the first beam and the second beam so as to make the reflection result of the first beam and the reflection result of the second beam be equal to each other. According to results of the comparison, for adjustment of the parameter, the parameter may be adjusted based on the obtained location of the road sign 607. In addition, according to a result of comparing the reflection result of the first beam and the reflection result of the second beam, the distance sensor 101 may perform calibration on other beams such as a third beam, a fourth beam, etc.

According to results of the comparison, the distance sensor 101 may perform calibration, based on a prediction result of the reflection result of the first beam and a prediction result of the reflection result of the second beam, or may perform the calibration, based on a difference between the prediction result of the reflection result of the first beam and the prediction result of the reflection result of the second beam. For example, the distance sensor 101 may adjust the parameter, based on the prediction result of the reflection result of the second beam to which an error of five degrees is applied to the prediction result of the reflection result of the first beam.

According to the aforementioned method, the car 103 may perform calibration with respect to the distance sensor 101 in real-time whenever calibration is required, even while the car 103 is being driven. According to some exemplary embodiments, the car 103 may perform the calibration with respect to the distance sensor 101 in a periodic manner or in occurrence of an error, and may perform the calibration when a difference between a measurement result from another sensor and a measurement result from the distance sensor 101 is outside a predetermined range or when a difference between the measurement result from the distance sensor 101 and a prediction value stored in a server is outside a predetermined range. In addition, the car 103 may perform the calibration with respect to the distance sensor 101 when an error occurs. However, examples of the calibration are not limited thereto.

Figure 7:
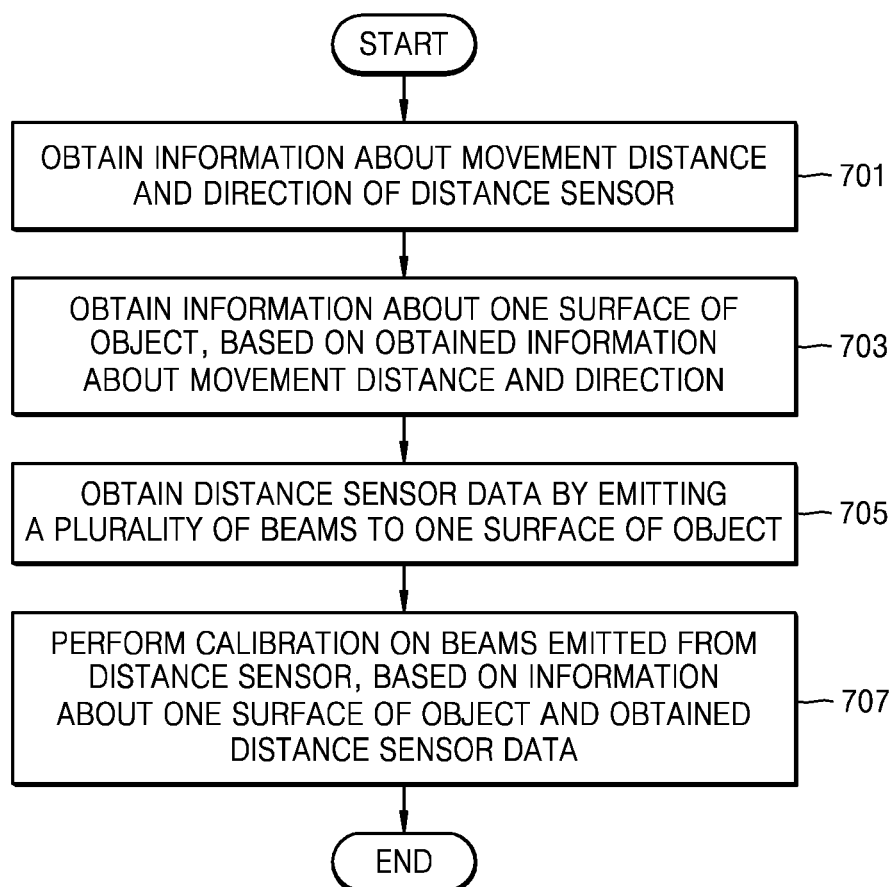
FIG. 7 is a flowchart of a calibration method performed by the distance sensor by using object information obtained based on a predicted location, according to some exemplary embodiments.

FIG. 7 is a flowchart of a calibration method performed by the distance sensor by using object information obtained based on a predicted location, according to some exemplary embodiments.

In operation 701, the distance sensor may obtain movement information about a movement distance of the distance sensor and a movement direction of the distance sensor. The movement information about the movement distance of the distance sensor and the movement direction may include a movement distance of the distance sensor, a movement direction of the distance sensor, and movement distances according to directions, and the movement information about the movement distance and the movement direction may mean information indicating how far and in which direction the distance sensor has moved.

According to some exemplary embodiments, the distance sensor may emit one beam to an object multiple times while the distance sensor is being moved, and may obtain the movement information about movement of the distance sensor, based on a plurality of reflection results. For example, the distance sensor may emit, at a first location, one beam to the object, may emit, at a second location, one beam to the object, and may predict a location of the distance sensor according to the movement distance of the distance sensor and the movement direction of the distance sensor, based on a reflection result at the first location and a reflection result at the second location.

According to some exemplary embodiments, the distance sensor matches a plurality of reflection results obtained while moving and based on a plurality of reflection signals, thereby predicting a relative change in locations of the distance sensor.

In operation 703, the distance sensor may obtain information about one surface of the object, based on the obtained information about a movement distance and movement direction.

According to some exemplary embodiments, the distance sensor may obtain the information about one surface of the object, based on the location information and the reflection results obtained in operation 701. For example, the distance sensor matches the reflection result of the beam emitted at the first location with the reflection result of the beam emitted at the second location, based on the obtained location information, thereby obtaining the information about one surface of the object.

According to some exemplary embodiments, the distance sensor may obtain the information about one surface of the object by additionally taking into account data obtained by using at least one other sensor such as an inertial sensor, a position sensor, or the like. For example, when the distance sensor matches the reflection result of the beam emitted at the first location with the reflection result of the beam emitted at the second location, the distance sensor performs matching based on information obtained by using another sensor such as the inertial sensor, an acceleration sensor, or the position sensor, thereby reducing a number of times the distance sensor attempts matching.

In operation 705, the distance sensor may obtain distance sensor data by emitting a plurality of beams to one surface of the object. This corresponds to what is described above.

In operation 707, the distance sensor may perform calibration on the beams emitted from the distance sensor, based on the information about one surface of the object and the distance sensor data.

According to some exemplary embodiments, the distance sensor may compare the information about one surface of the object obtained in operation 703 with the distance sensor data obtained in operation 705, and then may perform the calibration on the beams. The calibration method corresponds to what is described above, thus, detailed descriptions thereof are omitted here.

Figure 8:
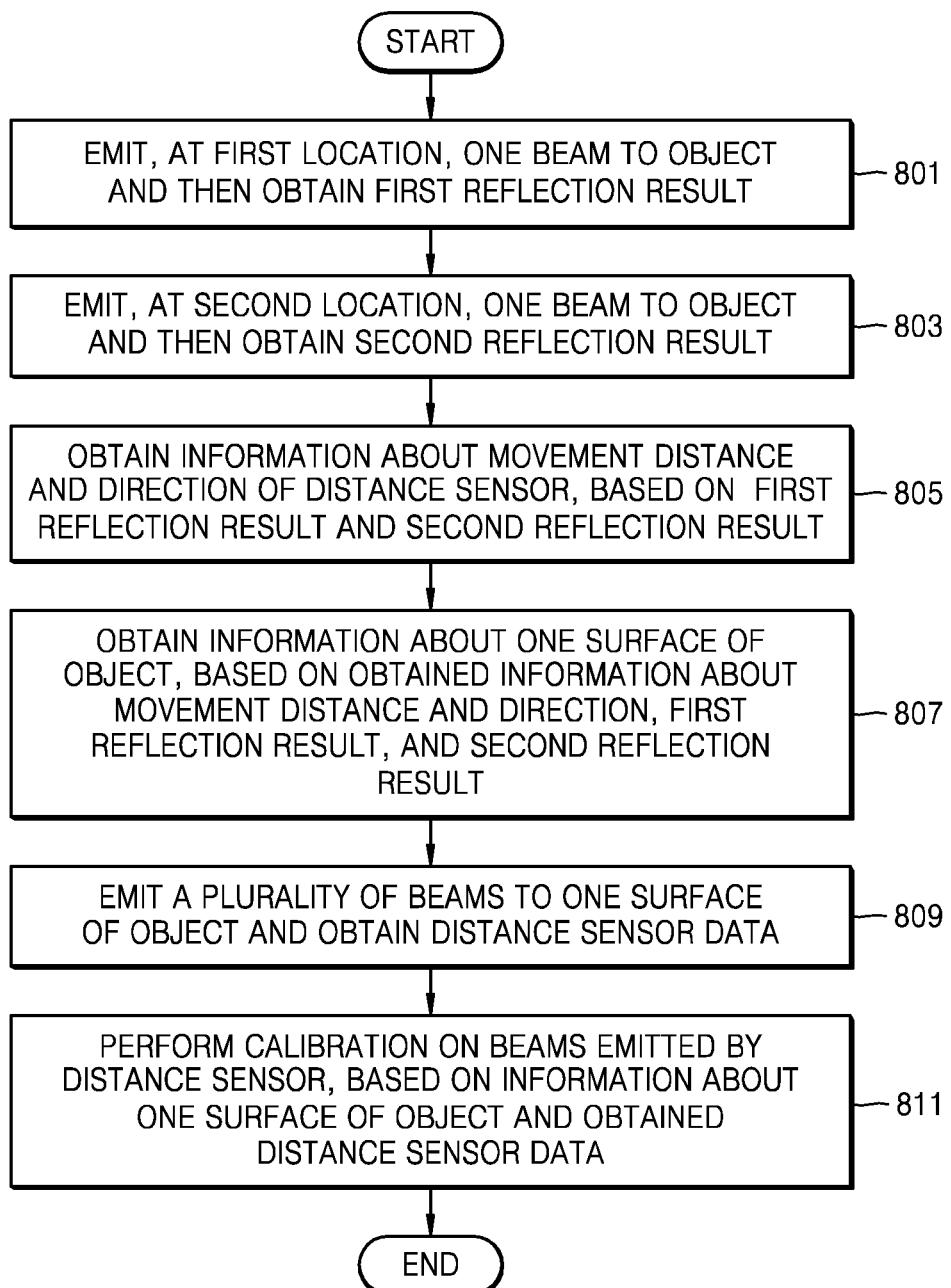
FIG. 8 is a detailed flowchart of the calibration method performed by the distance sensor by using the object information obtained based on the predicted location, according to some exemplary embodiments.

FIG. 8 is a detailed flowchart of the calibration method performed by the distance sensor by using the object information obtained based on the predicted location, according to some exemplary embodiments.

In operation 801, the distance sensor at a first location may emit one beam to an object, and may obtain a first reflection result reflected from the object. That is, when the distance sensor is located at the first location, the distance sensor may emit one beam to the object by using one of a plurality of laser emitters included in the distance sensor, and may receive a first reflection signal.

In operation 803, the distance sensor at a second location may emit one beam to the object, and may obtain a second reflection result reflected from the object. That is, when the distance sensor is located at the second location, the distance sensor may emit one beam to the object by using one of the laser emitters included in the distance sensor, and may receive a second reflection signal. According to some exemplary embodiments, a location may include a geographic location.

In operation 805, the distance sensor may obtain information about a movement distance and direction of the distance sensor, based on the first reflection result and the second reflection result.

According to some exemplary embodiments, the distance sensor matches the first reflection result with the second reflection result, thereby predicting a movement distance of the distance sensor, a movement angle of the distance sensor, and a relative location of the distance sensor with respect to movement. For example, the distance sensor may estimate a distance, an angle, a movement trajectory, or the like between the first point and the second point.

In operation 807, the distance sensor may obtain information about one surface of the object, based on the obtained information about a movement distance and direction, the first reflection result, and the second reflection result.

According to some exemplary embodiments, the distance sensor matches the first reflection result with the second reflection result, thereby obtaining the information about one surface of the object. Since a calibration is not required for distance sensor data obtained by using one beam, the distance sensor may obtain the information about one surface of the object without calibration.

In operation 809, the distance sensor may emit a plurality of beams to one surface of the object, thereby obtaining the distance sensor data. Since this operation corresponds to what is described above, detailed descriptions thereof are omitted here.

In operation 811, the distance sensor may perform calibration on the beams emitted by the distance sensor, based on the information about one surface of the object and the distance sensor data.

According to some exemplary embodiments, operation 809 may be performed together with operations 801 through 803. For example, the distance sensor may emit the beams to the object, may estimate a relative location of the distance sensor by matching reflection results of at least two beams, may obtain the information about one surface of the object by using the estimated location and the reflection results of at least two beams, and may perform calibration on the beams, based on the distance sensor data obtained in operation 809.

Figure 9:
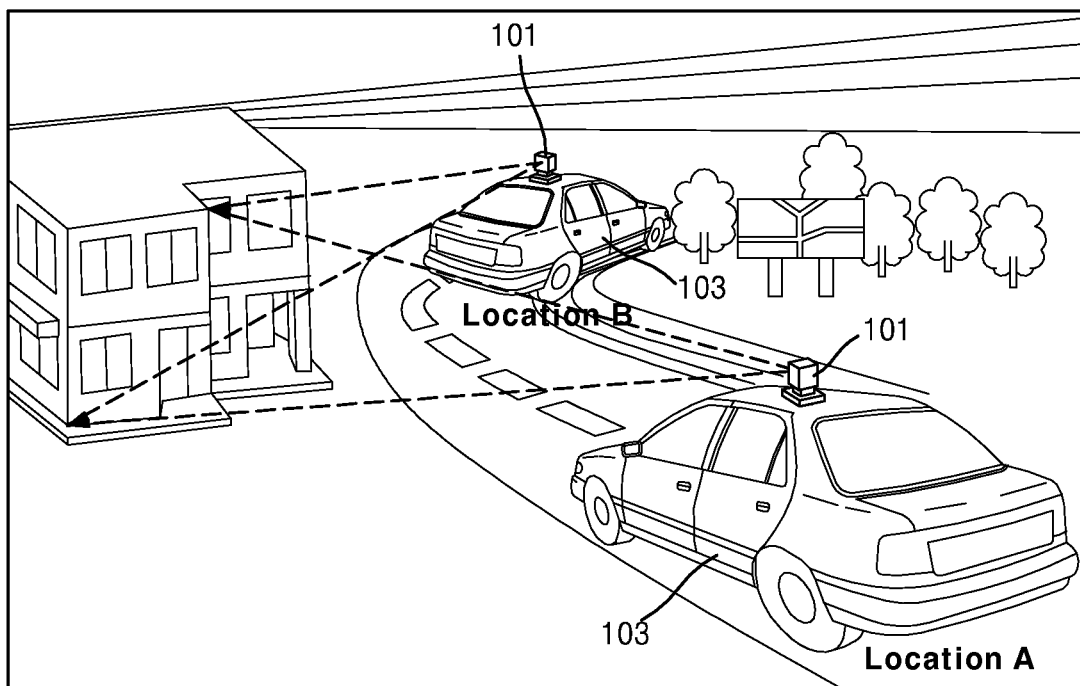
FIG. 9 illustrates a calibration system of the distance sensor using object information obtained based on a predicted location, according to some exemplary embodiments.

FIG. 9 illustrates a calibration system of the distance sensor using object information obtained based on a predicted location, according to some exemplary embodiments.

According to some exemplary embodiments, the car 103 has the distance sensor 101 mounted therein. As described above, the distance sensor 101 may obtain information about one surface of an object from the external server 105, and in this regard, the information about one surface of the object may be obtained by using a method described below. The information about one surface of the object may include location information about a location of the object and shape information about a shape of one surface of the object, and may further include reflectance information about reflectance of one surface of the object.

Referring to an example of FIG. 9, the car 103 is driving, and the distance sensor 101 mounted in the car 103 is also driving with the car 103. The distance sensor 101 emits, at a location A, one beam to the object, and emits, at a location B, one beam to the object.

According to some exemplary embodiments, the distance sensor 101 may obtain a first reflection result that is a reflection result of the beam emitted from the location A to the object, and may obtain a second reflection result that is a reflection result of the beam emitted from the location B to the object. The distance sensor 101 may obtain information about a movement distance and direction by estimating a location, a movement distance, a movement trajectory, or the like of the distance sensor 101 by using the first reflection result and the second reflection result. The distance sensor 101 may obtain the information about one surface of the object, based on the information about a movement distance and direction, the first reflection result, and the second reflection result.

According to some exemplary embodiments, the distance sensor 101 matches data obtained by processing the first reflection result with the second reflection result according to the movement distance and direction of the distance sensor 101, thereby obtaining the information about one surface of the object.

According to some exemplary embodiments, the distance sensor 101 may obtain distance sensor data, based on a plurality of reflection results. The distance sensor 101 may compare the obtained distance sensor data with the information about one surface of the object, and then may perform calibration.

In addition, when the distance sensor 101 emits, at the location A, one beam to the object, or emits, at the location B, one beam to the object, the distance sensor 101 may simultaneously emit a plurality of beams and then may obtain the distance sensor data. That is, the distance sensor 101 may obtain the information about one surface of the object by emitting one beam and then may obtain the distance sensor data, or may simultaneously emit the beams when the distance sensor 101 emits one beam at the location A or B, and then may obtain the distance sensor data.

According to the aforementioned method, whenever required, the car 103 may perform calibration with respect to the distance sensor 101 even if the car 103 is driving.

Figure 10:
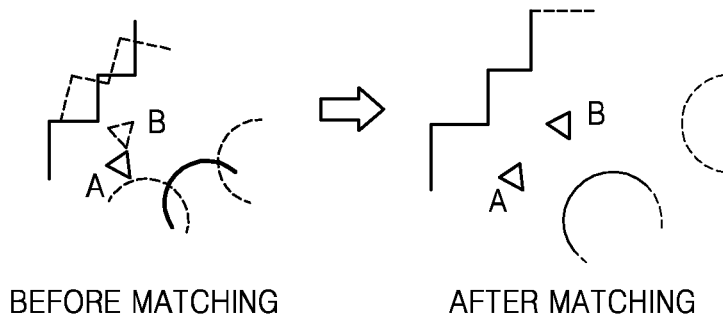
FIG. 10 illustrates a method of matching a reflection result with another reflection result, according to some exemplary embodiments.

FIG. 10 illustrates a method of matching a reflection result with another reflection result, according to some exemplary embodiments.

According to some exemplary embodiments, the distance sensor may obtain a first reflection result based on a reflection signal of a beam emitted from a location A to an object, and may obtain a second reflection result based on a reflection signal of a beam emitted from a location B to the object. Referring to FIG. 10, the first reflection result is illustrated by using a solid line, and the second reflection result is illustrated by using a broken line.

According to some exemplary embodiments, the distance sensor matches the first reflection result with the second reflection result, thereby predicting the location A from which the first reflection result is obtained and the location B from which the second reflection result is obtained. That is, the distance sensor may match the first reflection result with the second reflection result so as to make a predetermined standard be fulfilled.

For example, the distance sensor may match the first reflection result with the second reflection result so as to make entropy be minimal. Alternatively, the distance sensor may match the first reflection result with the second reflection result so as to make a distance between a predetermined point in the first reflection result and a predetermined point in the second reflection result be minimal. Alternatively, the distance sensor may match the first reflection result with the second reflection result so as to make an overlapping part between the first reflection result and the second reflection result be maximal. That is, the distance sensor may match the first reflection result with the second reflection result by using various methods so as to obtain an optimal matching result.

According to some exemplary embodiments, before reflection results are matched with each other, it is difficult for the distance sensor to recognize where the location A and the location B exactly are. However, after the reflection results are matched with each other, the distance sensor may check a relative change in the location A and the location B, may recognize a movement distance, an angle, a trajectory, or the like of the distance sensor, based on the matching result, and may obtain information about one surface of the object.

As described above, the distance sensor may perform calibration on the beams, based on comparison between the obtained information about one surface of the object and the distance sensor data.

Figure 11:
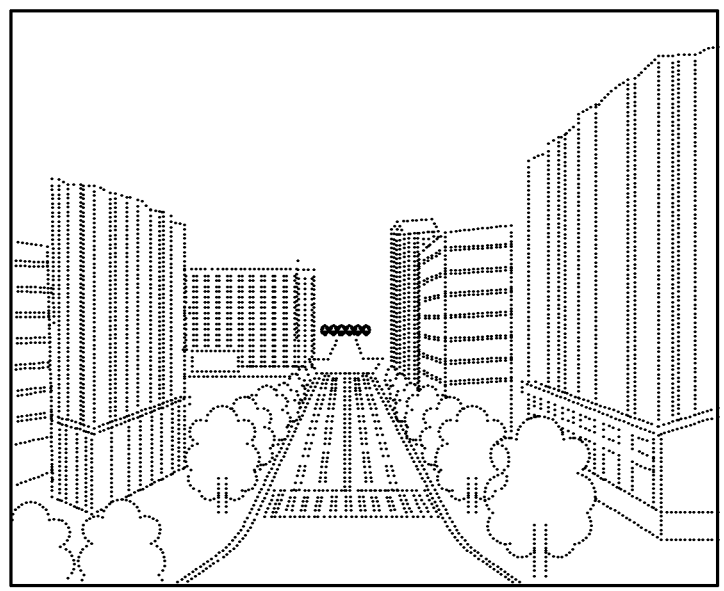
FIG. 11 illustrates a shape of an object which is obtained by a distance sensor, according to some exemplary embodiments.

FIG. 11 illustrates a shape of an object which is obtained by a distance sensor, according to some exemplary embodiments.

According to some exemplary embodiments, the distance sensor mounted in a driving car may emit at least one beam to an object located within a predetermined distance from the car. The distance sensor may obtain a reflection signal that is a signal of the emitted beam that has been reflected from the object, and may process the obtained reflection signal, thereby displaying the object as an image or modelling the object.

The reflection signal that is the signal reflected and thus returning from the object may be processed and then displayed as an image including a plurality of points. A group of the displayed points of the reflection signal is referred to as a 3D point cloud. That is, the distance sensor processes the reflection signal, thereby obtaining a reflection result or distance sensor data which has a 3D point cloud format.

Even if the distance sensor emits a plurality of beams to an object by using a plurality of laser emitters, reflection results respectively corresponding to the beams may vary. That is, a characteristic such as emission intensity, an angle, a refractive index, etc. of each beam may be different from that of another beam, thus, calibration is required to obtain accurate distance sensor data (or reflection results) by using the beams.

Figure 12:
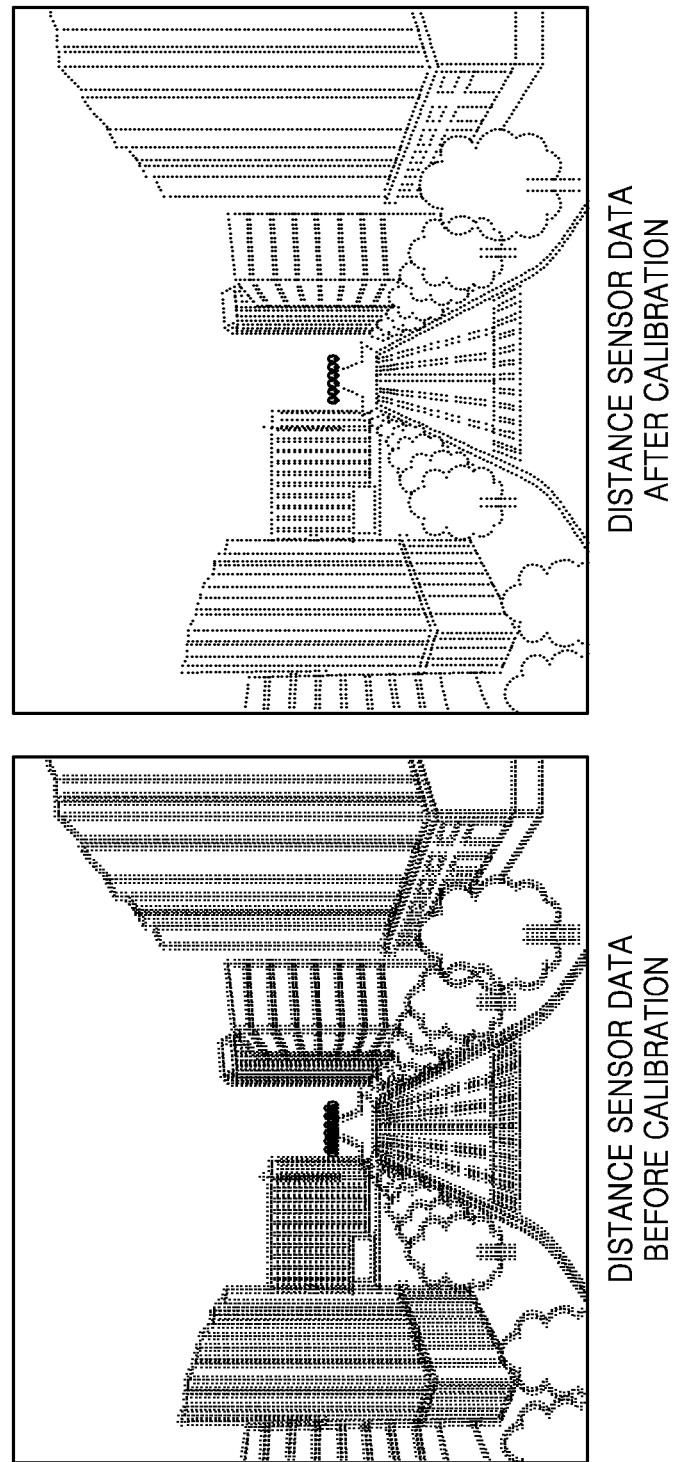
FIG. 12 illustrates shapes of an object before and after calibration, according to some exemplary embodiments.

FIG. 12 illustrates shapes of an object before and after calibration, according to some exemplary embodiments.

Referring to FIG. 12, an image of the object in distance sensor data obtained by the distance sensor before the calibration is performed is blurring and unclearly displayed. In more detail, points that respectively correspond to a plurality of reflection signals are spread, and points indicating a same object are not exactly matched. That is, since reflection results obtained by processing the reflection signals reflected from the same object are different from each other, the points indicating the same object are not exactly matched.

Since distance sensor data is used in generating a map, predicting a location, and recognizing surroundings, accuracy of the distance sensor data is required to be high. Thus, the distance sensor performs calibration on a plurality of beams. When the calibration is performed, an image of an object in the distance sensor data after the calibration is performed is clearly displayed. Types of the calibration are described with reference to FIG. 13.

Figure 13:
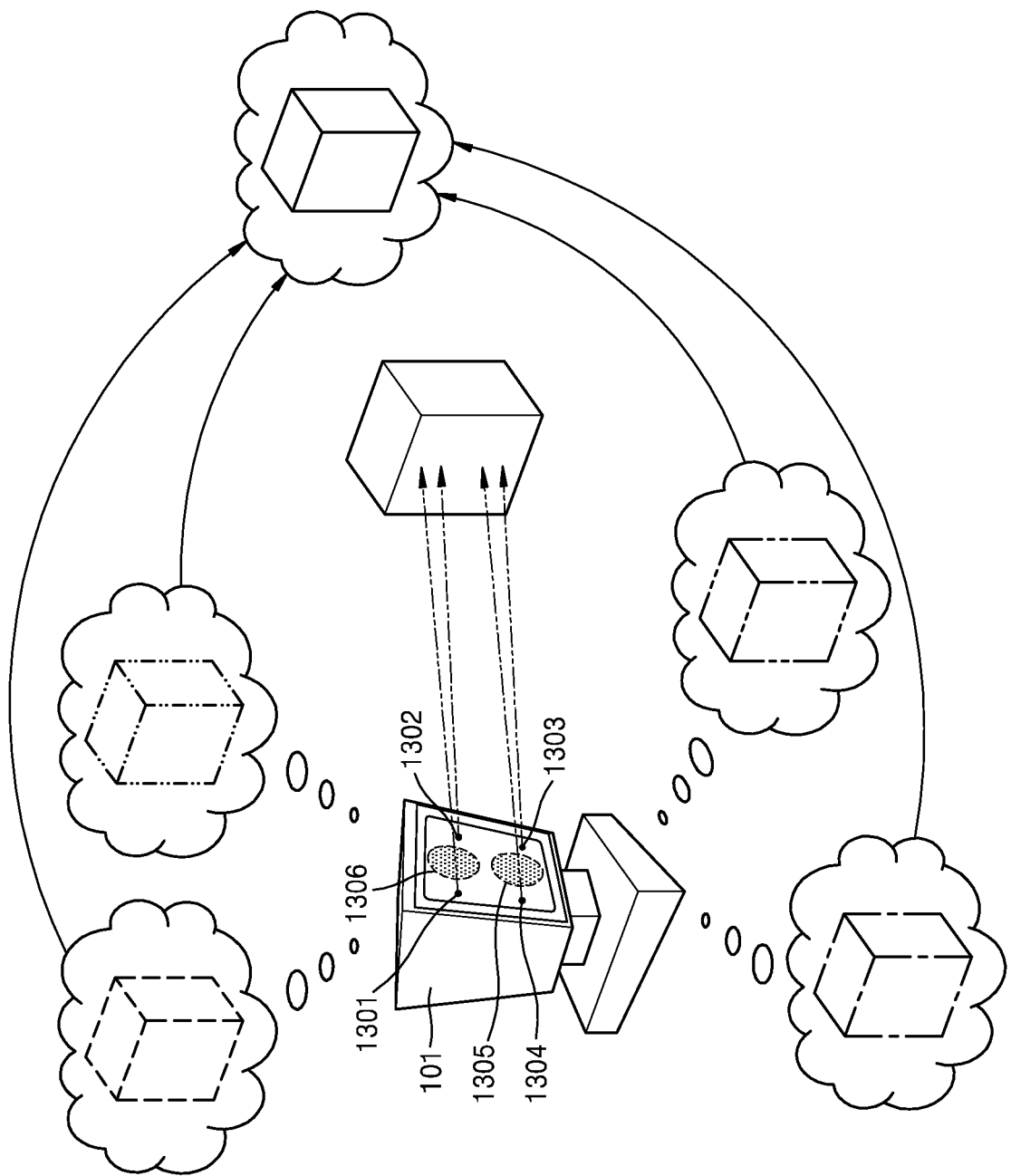
FIG. 13 is a diagram for describing types of calibration performed by the distance sensor, according to some exemplary embodiments.

FIG. 13 is a diagram for describing types of calibration performed by the distance sensor 101, according to some exemplary embodiments.

As illustrated in FIG. 13, the distance sensor 101 may include first through fourth laser emitters 1301 through 1304, and a plurality of laser receivers 1305 and 1306. The first through fourth laser emitters 1301 through 1304 and the laser receivers 1305 and 1306 may be mounted in a car, separately from the distance sensor 101, and may operate by the control of the distance sensor 101.

Each of the first through fourth laser emitters 1301 through 1304 emits a beam to a same object. The emitted beams are reflected from the object, and reflection signals of the beams are received by the laser receivers 1305 and 1306. However, characteristics such as emission intensity, an angle, a refractive index, etc. of the beams that are respectively emitted from the first through fourth laser emitters 1301 through 1304 may be different from each other. Since the characteristics of the beams are different, even if the beams were emitted to the same object, the reflection signals received by the laser receivers 1305 and 1306 may be different, and reflection results or a plurality of items of distance sensor data obtained through the reflection signals may also be different. Therefore, in order to obtain accurate distance sensor data, calibration is required.

For example, the calibration may be performed to make distance sensor data obtained by using the first laser emitter 1301 and distance sensor data obtained by using the second laser emitter 1302 become identical. A calibration method may include an extrinsic calibration method and an intrinsic calibration method.

The intrinsic calibration method refers to a method of performing calibration by adjusting a parameter for processing a reflection signal of the beam emitted from the first laser emitter 1301, and a parameter for processing a reflection signal of the beam emitted from the second laser emitter 1302. That is, when the distance sensor 101 processes a reflection signal of each laser emitter and thus displays (or models) the reflection signal as an image, the distance sensor 101 may obtain accurate distance sensor data by adjusting a parameter according to a characteristic of each laser emitter.

The extrinsic calibration method refers to a method of adjusting determined parameters according to locations of the first laser emitter 1301 and the second laser emitter 1302. That is, the parameters that are used in transforming coordinates used in modelling an object or an image of the object which is generated based on the reflection results of the beams emitted from the first laser emitter 1301 and the second laser emitter 1302, and coordinates of locations of the first laser emitter 1301 and the second laser emitter 1302 are adjusted.

Figure 14:
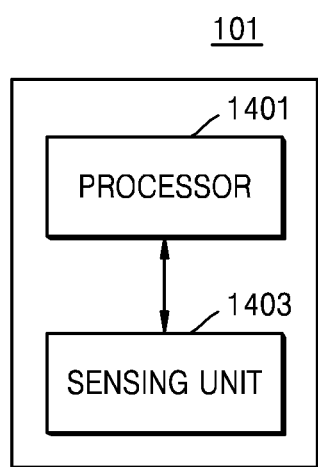
FIG. 14 is a block diagram of the distance sensor that performs calibration, according to some exemplary embodiments.

FIG. 14 is a block diagram of the distance sensor 101 that performs calibration, according to some exemplary embodiments.

As illustrated in FIG. 14, the distance sensor 101 according to some exemplary embodiments may include a processor 1401 and a sensing unit 1403. However, not all elements shown in FIG. 14 are necessary elements of the distance sensor 101. That is, the distance sensor 101 may be embodied with more or less elements than the elements shown in FIG. 14.

According to some exemplary embodiments, the processor 1401 controls general operations of the distance sensor 101 including the sensing unit 1403. For example, the processor 1401 may execute a program stored in the distance sensor 101 and thus may generally control elements (e.g., the sensing unit 1403) included in the distance sensor 101.

According to some exemplary embodiments, the processor 1401 may perform calibration on at least one beam emitted from the distance sensor 101, based on information about one surface of an object, and distance sensor data obtained by using the sensing unit 1403. In addition, the processor 1401 may compare an obtained shape of one surface of the object with each of reflection results based on reflection signals of a plurality of beams, and may perform calibration on the beams, based on results of the comparison.

For example, the processor 1401 may adjust a parameter for processing the reflection results of the beams so as to make the reflection results of the beams be equal to each other, or may perform the calibration on each of the beams so as to allow points in distance sensor data to be matched, the distance sensor data being obtained by combining or incorporating the reflection results.

As described above, the parameter may include at least one of a beam horizontal angle parameter, a beam vertical angle parameter, a measurement distance offset parameter, and a reflectance parameter.

According to some exemplary embodiments, the sensing unit 1403 may obtain the information about one surface of the object, and may emit the beams to one surface of the object, thereby obtaining the distance sensor data.

According to some exemplary embodiments, the processor 1401 may obtain the information about one surface of the object from an external server. The information about the one surface may include location information of the object and information about a shape of the one surface of the object. That is, the processor 1401 may receive the information about one surface of the object via a separate communication interface.

According to some exemplary embodiments, the processor 1401 may control the sensing unit 1403 to emit a plurality of beams, based on the obtained location information of the object, and to obtain distance sensor data about one surface of the object, based on reflection results of the emitted beams that are reflected from the object.

The processor 1401 may control the sensing unit 1403 to obtain information about a movement distance of the distance sensor 101 and a movement direction of the distance sensor 101, and to obtain the information about one surface of the object, based on the obtained information about a movement distance and direction. For example, the processor 1401 may control the sensing unit 1403 to obtain a first reflection result about a beam that was emitted at a first location to the object and then was reflected from the object, and obtain a second reflection result about a beam that was emitted at a second location to the object and then was reflected from the object, and then the processor 1401 may obtain the information about a movement distance of the distance sensor 101 and a movement direction of the distance sensor 101, based on the first reflection result and the second reflection result. The processor 1401 may obtain the information about one surface of the object, based on the obtained information about a movement distance of the distance sensor 101 and a movement direction of the distance sensor 101, the first reflection result, and the second reflection result.

According to some exemplary embodiments, the processor 1401 may match the first reflection result with the second reflection result, and may predict the first location and the second location, based on a result of the matching, or may match the first reflection result with the second reflection result by using data obtained by using at least one other sensor such as a position sensor or an inertial sensor.

Figure 15:
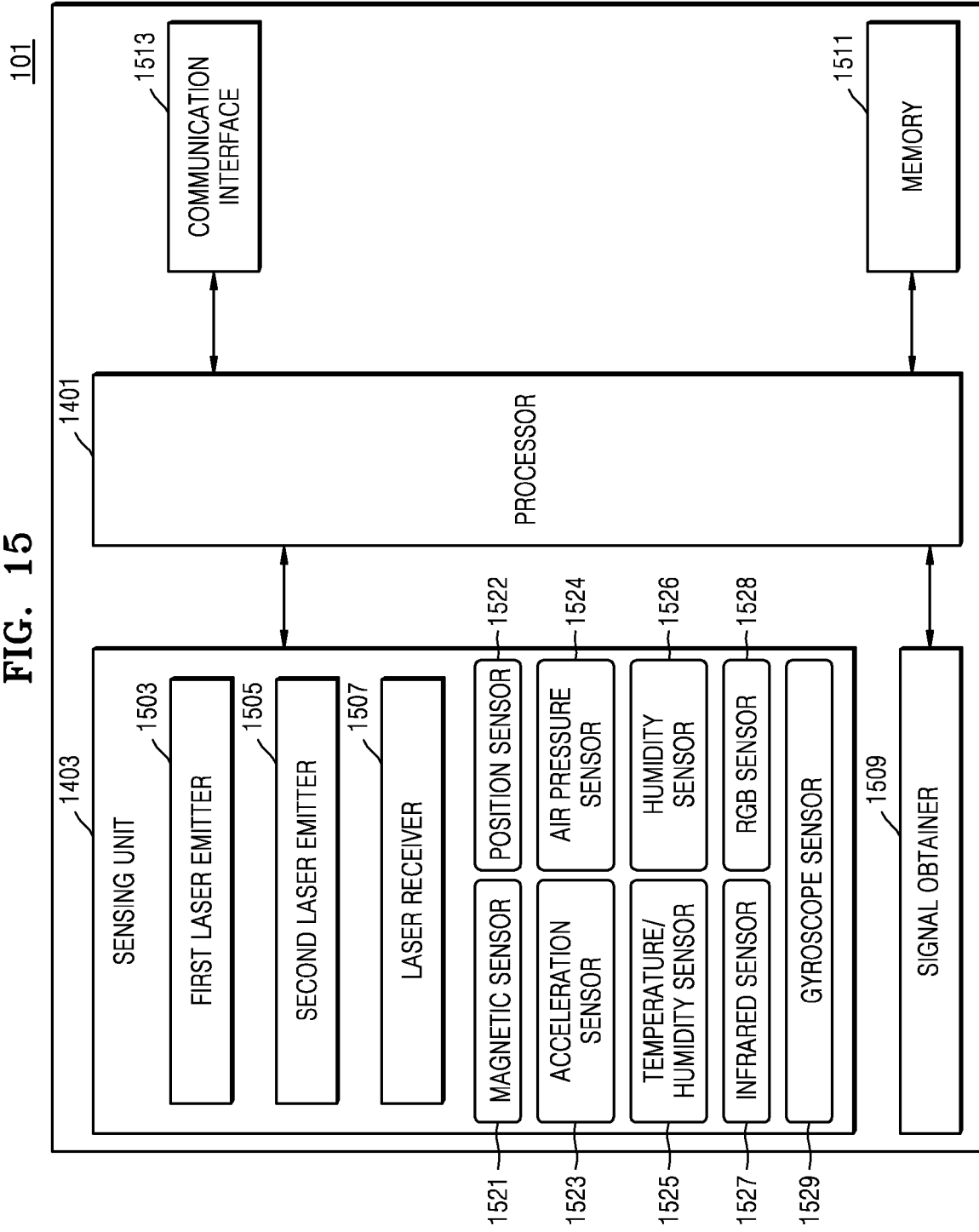
FIG. 15 is a block diagram of the distance sensor that performs calibration, according to some exemplary embodiments.

FIG. 15 is a block diagram of the distance sensor 101 that performs calibration, according to some exemplary embodiments.

As illustrated in FIG. 15, the distance sensor 101 that performs calibration on a plurality of beams may further include a signal obtainer 1509, a memory 1511, and a communication interface 1513, in addition to the processor 1401 and the sensing unit 1403. However, not all elements shown in FIG. 15 are necessary elements of the distance sensor 101. That is, the distance sensor 101 may be embodied with more or less elements than the elements shown in FIG. 15.

Operations by the processor 1401 correspond to the operations of the processor 1401 described above, thus, detailed descriptions thereof are omitted.

According to some exemplary embodiments, the sensing unit 1403 may include a first laser emitter 1503, a second laser emitter 1505, and at least one laser receiver 1507. The laser receiver 1507 may be plural in number. The processor 1401 may control the sensing unit 1403 to emit a plurality of beams, based on location information of an object which is obtained by controlling the first laser emitter 1503 and the second laser emitter 1505, and obtain distance sensor data about one surface of the object by receiving, via the laser receiver 1507, reflection results of the beams reflected from the object.

The sensing unit 1403 may include, but is not limited to, at least one of a magnetic sensor 1521, a position sensor (e.g., a global positioning system (GPS)) 1522, an acceleration sensor 1523, an air pressure sensor 1524, a temperature/humidity sensor 1525, a proximity sensor 1526, an infrared sensor 1527, an RGB sensor (i.e., a luminance sensor) 1528, and a gyroscope sensor 1529. Functions of the sensors may be intuitionally deduced by one of ordinary skill in the art by referring to names of the sensors, and thus, detailed descriptions thereof are omitted here.

According to some exemplary embodiments, the processor 1401 may control the sensing unit 1403 to obtain data by using the sensors 1522 through 1529, and may obtain information about one surface of the object by additionally taking into account the data. For example, when the processor 1401 matches a reflection result of a beam emitted at a first location with a reflection result of a beam emitted at a second location, the processor 1401 may perform matching based on data obtained by using at least one other sensor, such as the magnetic sensor 1521, the position sensor 1522, the acceleration sensor 1523, the air pressure sensor 1524, the temperature/humidity sensor 1525, the proximity sensor 1526, the infrared sensor 1527, the RGB sensor 1528, and/or the gyroscope sensor 1529, and thus may reduce a number of times of attempting matching.

According to some exemplary embodiments, the signal obtainer 1509 may obtain signals other than a reflection result such as a reflection signal. For example, the signal obtainer 1509 may include a camera, and may additionally obtain data of an object around a car by using the camera. In addition, the signal obtainer 1509 may include a microphone, and additionally obtain data of the object around the car by using an acoustic signal.

According to some exemplary embodiments, other signals obtained by using the signal obtainer 1509 may be used in calibration.

According to some exemplary embodiments, a program for processing and controlling the processor 1401 or the communication interface 1513 may be stored in the memory 1511, or data input to or output from the distance sensor 101 may be stored in the memory 1511.

According to some exemplary embodiments, the memory 1511 may include a storage medium of at least one type selected from a flash memory, a hard disk, a multimedia card type memory, a card type memory such as a secure digital (SD) or xD-Picture (xD) card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The communication interface 1513 may receive the information about one surface of the object from an external server and may transmit the information to the processor 1401 or the sensing unit 1403. That is, the communication interface 1513 may obtain information that can be obtained by elements in the distance sensor 101, from the external server through various frequency bands and by using various communication schemes.

The communication interface 1513 may include modules for communication based on various schemes in various frequency bands. For example, the communication interface 1513 may include, but is not limited to, a Bluetooth communicator, a Bluetooth Low Energy (BLE) communicator, a near field communication (NFC) unit, a WLAN (Wi-Fi) communicator, a ZigBee communicator, an infrared Data Association (IrDA) communicator, a Wi-Fi Direct (WFD) communicator, a ultra wideband (UWB) communicator, an Ant+ communicator, a 3G communicator, an LTE communicator, a TPEG communicator, and a DMB communicator.

In addition, the distance sensor 101 may further include a user interface, an output unit, or the like.

The exemplary embodiments of the present disclosure provide a method of performing calibration to increase accuracy of the distance sensor, whenever error correction is required.

The device according to the present disclosure may include a processor, a memory for storing and executing program data, a permanent storage including a disk drive, a communication port for communication with an external device, a user interface device including a touch panel, a key, a button, and the like. The methods embodied as a software module or an algorithm may be stored as non-transitory computer-readable codes or program commands that are executable on the processor in a computer readable recording medium. The non-transitory computer-readable recording medium is any data storage device that can store data which can be thereafter read by a computer system. Examples of the non-transitory computer-readable recording medium include magnetic storage media (e.g., ROMs, RAMs, floppy disks, hard disks, etc) and optical reading media including CD-ROMs, DVDs, etc. The non-transitory computer-readable recording medium can also be distributed over network-coupled computer systems so that the computer-readable code is stored and executed in a distributed fashion. The media can be read by computers, can be stored in the memory, and can be executed on the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the exemplary embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Furthermore, the present disclosure could employ any number of conventional techniques for electronics configuration, signal processing and/or data processing and the like. The words 'mechanism', 'element', 'means', and 'configuration may be used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to one of skilled in the art without departing from the spirit and scope of the present disclosure.

What is claimed is:
1. A calibration method performed by a distance sensor, the calibration method comprising:
  obtaining information about one surface of an object;
  obtaining distance sensor data by emitting a plurality of beams from the distance sensor to the one surface of the object and receiving a plurality of reflection signals of the plurality of beams; and performing calibration on the plurality of beams emitted by the distance sensor, based on the information about the one surface of the object and the distance sensor data, wherein the obtaining the information about the one surface of the object comprises:

obtaining a first reflection result at a first location and a second reflection result at a second location, obtaining movement information of the distance sensor based on the first reflection result and the second reflection result, and obtaining the information about the one surface of the object based on the movement information of the distance sensor, the first reflection result, and the second reflection result.

2. The calibration method of claim 1, wherein the information about the one surface of the object comprises location information of the object and shape information about a shape of the one surface of the object.

3. The calibration method of claim 2, wherein the obtaining the distance sensor data comprises:

emitting the plurality of beams, based on the location information of the object; and obtaining the distance sensor data about the one surface of the object, based on a plurality of reflection results corresponding to the plurality of reflection signals of the plurality of beams.

4. The calibration method of claim 3, wherein the performing the calibration comprises:

comparing the shape information about the shape of the one surface of the object with each of the plurality of reflection results corresponding to the plurality of reflection signals of the plurality of beams; and performing the calibration on each of the plurality of beams, based on results of the comparing the shape information.

5. The calibration method of claim 4, wherein the performing the calibration on each of the plurality of beams comprises adjusting a parameter for processing the plurality of reflection signals of the plurality of beams to obtain the plurality of reflection results so as to make the plurality of reflection results corresponding to the plurality of reflection signals of the plurality of beams be equal to each other or to make the plurality of reflection results corresponding to the plurality of reflection signals of the plurality of beams be equal to predicted reflection results.

6. The calibration method of claim 5, wherein the parameter comprises at least one of a beam horizontal angle parameter, a beam vertical angle parameter, a measurement distance offset parameter, or a reflectance parameter.

7. The calibration method of claim 1, wherein the movement information of the distance sensor comprises at least one of a movement distance of the distance sensor or a movement direction of the distance sensor.

8. The calibration method of claim 1, wherein the obtaining the first reflection result at the first location and the second reflection result at the second location comprises:

emitting, at the first location, a first beam to the object and obtaining the first reflection result corresponding to a first reflection signal of the first beam; and emitting, at the second location, a second beam to the object and obtaining the second reflection result corresponding to a second reflection signal of the second beam, wherein the first beam and the second beam are different from the plurality of beams or are included in the plurality of beams.

9. The calibration method of claim 1, wherein the obtaining the movement information based on the first reflection result and the second reflection result comprises:

estimating the first location and the second location, based on the first reflection result and the second reflection result;

matching the first reflection result with the second reflection result; and predicting the first location and the second location, based on a result of the matching.

10. The calibration method of claim 9, wherein the matching the first reflection result with the second reflection result comprises matching the first reflection result with the second reflection result based on data obtained by using at least one sensor different from the distance sensor.

11. A distance sensor comprising:

a sensing unit configured to emit a plurality of beams and receive a plurality of reflection signals of the plurality of beams; and a processor configured to:

obtain information about one surface of an object, control the sensing unit to obtain distance sensor data by emitting the plurality of beams to the one surface of the object and receive the plurality of reflection signals of the plurality of beams, and perform calibration on at least one beam from among the plurality of beams emitted by the sensing unit, based on the information about the one surface of the object and the distance sensor data, wherein the processor is further configured to:

obtain a first reflection result at a first location and a second reflection result as a second location, obtain movement information of the distance sensor based on the first reflection result and the second reflection result, and obtain the information about the one surface of the object based on the movement information of the distance sensor, the first reflection result, and the second reflection result.

12. The distance sensor of claim 11, wherein the information about the one surface of the object comprises location information of the object and shape information about a shape of the one surface of the object.

13. The distance sensor of claim 12, wherein the processor is further configured to control the sensing unit to emit the plurality of beams, based on the location information of the object, and to obtain the distance sensor data about the one surface of the object, based on a plurality of reflection results corresponding to the plurality of reflection signals of the plurality of beams.

14. The distance sensor of claim 13, wherein the processor is further configured to perform a comparison of the shape information about the shape of the one surface of the object with each of the plurality of reflection results corresponding to the plurality of reflection signals of the plurality of beams, and to perform the calibration on each of the plurality of beams, based on results of the comparison of the shape information.

15. The distance sensor of claim 14, wherein the processor is further configured to adjust an parameter for processing the plurality of reflection signals of the plurality of beams to obtain the plurality of reflection results so as to make the plurality of reflection results corresponding to the plurality of reflection signals of the plurality of beams be equal to each other or to make the plurality of reflection results corresponding to the plurality of reflection signals of the plurality of beams be equal to predicted reflection results.

16. The distance sensor of claim 15, wherein the parameter comprises at least one of a beam horizontal angle parameter, a beam vertical angle parameter, a measurement distance offset parameter, or a reflectance parameter.

17. The distance sensor of claim 11, wherein the movement information of the distance sensor comprises at least one of a movement distance of the distance sensor or a movement direction of the distance sensor.

18. The distance sensor of claim 11, wherein the processor is further configured to:
   control the sensing unit to emit, at the first location, a first beam to the object to obtain the first reflection result corresponding to a first reflection signal of the first beam, and
   control the sensing unit to emit, at the second location, a second beam to the object to obtain the second reflection result corresponding to a second reflection signal of the second beam,
   wherein the first beam and the second beam are beams different from the plurality of beams or are included in the plurality of beams.

19. The distance sensor of claim 11, wherein the processor is further configured to match the first reflection result with the second reflection result, and to predict the first location and the second location, based on a result of the matching.

20. The distance sensor of claim 19, wherein the processor is further configured to match the first reflection result with the second reflection result by using data obtained by using at least one sensor different from the distance sensor.

21. A non-transitory computer-readable recording medium having recorded thereon a program that is executed by a computer to perform the method of claim 1.

* * * * *